March 10, 1936. J. B. PASTORE 2,033,646
MEASURING APPARATUS
Filed Feb. 18, 1935 2 Sheets-Sheet 1

INVENTOR
John B. Pastore

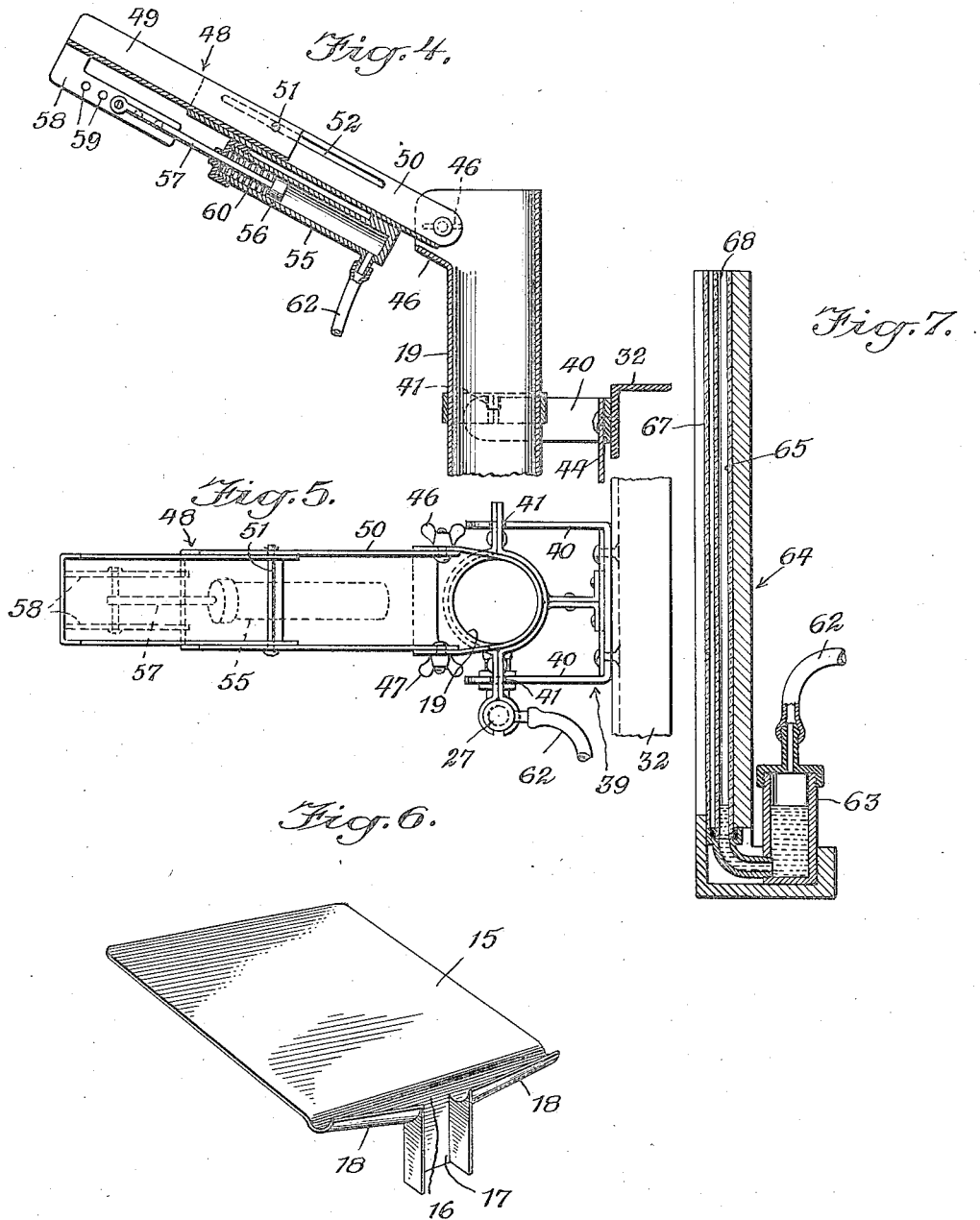

Patented Mar. 10, 1936

2,033,646

UNITED STATES PATENT OFFICE 2,033,646

MEASURING APPARATUS

John B. Pastore, New York, N. Y.

Application February 18, 1935, Serial No. 7,117

2 Claims. (Cl. 73—54)

This invention relates to improvements in measuring apparatus, and has particular relation to apparatus for measuring the loss of blood during certain operations, particularly child delivery.

It is a particular object of the invention to provide an improved device of this character which will accurately reveal to the surgeon or obstetrician at all times throughout the operation the exact amount of blood which has been lost by the patient without requiring the surgeon to remove his attention from the field of operation.

A further object is the provision of an improved measuring apparatus for collecting, retaining and measuring a fluid without clogging or jamming and which will accurately reveal on a conveniently positioned indicator the exact amount of fluid accumulated in any given time.

With these and other objects in view reference should be had to the accompanying drawings, in which Figure 1 is a side elevation of a delivery table having a measuring apparatus embodying my invention affixed thereto;

Figure 4 is a side elevation in section of the upper end of the receptacle shown in Figure 3 having a slide or chute secured thereto;

Figure 5 is a plan view of the receptacle and chute;

Figure 6 is a perspective view of a plate which is placed on the operating table for receiving the fluid to be measured; and Figure 7 is a side elevation in section of a gage or indicator which may be used in association with the measuring apparatus.

In the accompanying drawings the measuring apparatus is illustrated as applied to a delivery table, but it is to be understood that it may be used in other associations such as, for instance, with an operating table.

Figure 1:
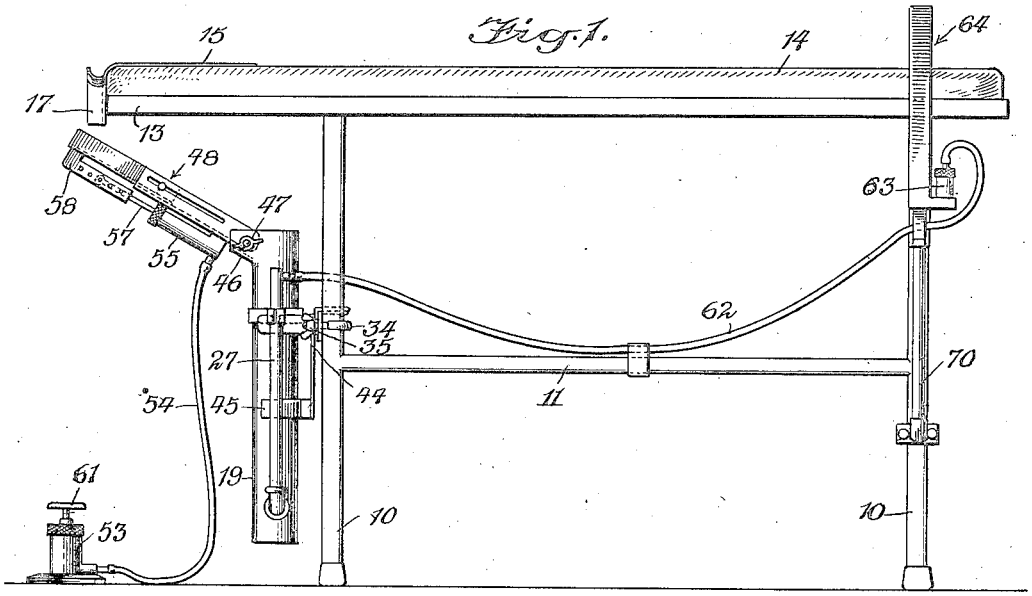
Figure 2:
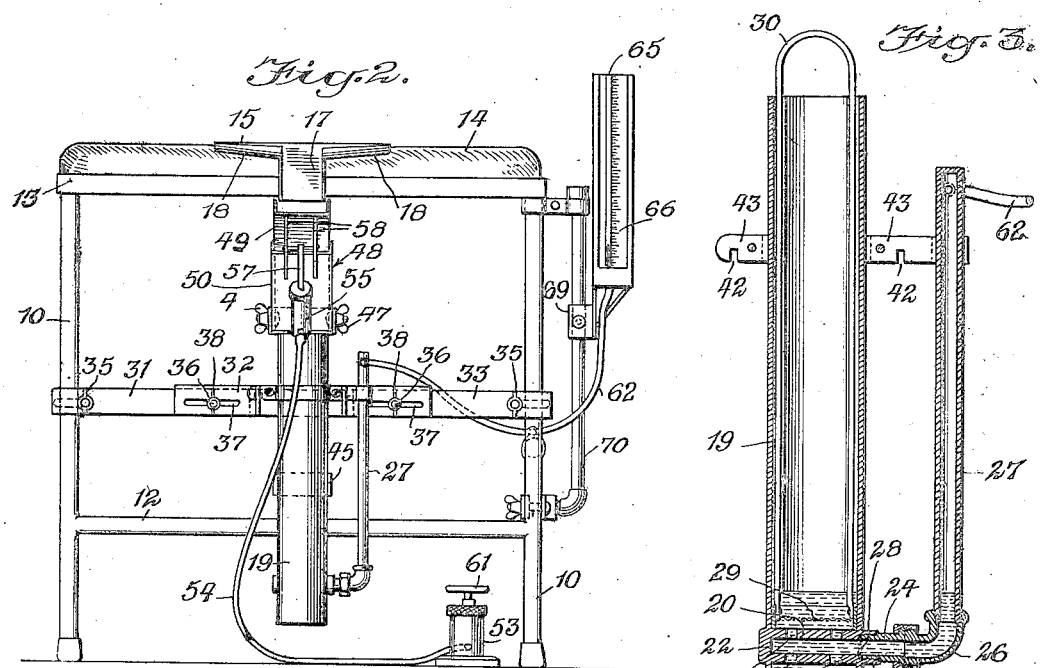
Figure 2 is an end elevation of the table shown in Figure 1.
Figure 3:
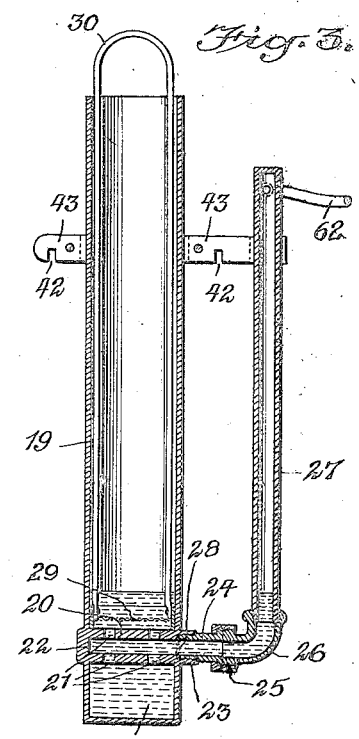
Figure 3 is a sectional view of a receptacle for retaining the fluid to be measured.

The delivery table illustrated is of the conventional type having legs 10, longitudinal and lateral braces 11 and 12 respectively, and a horizontal top 13 on which a cushion 14 is preferably disposed. Conveniently positioned on the top of the table so as to receive any blood lost by the patient being operated on is a plate 15 comprising a relatively large horizontally disposed portion with a depending flange 16 at one end. The flange is preferably formed with a central channel 17 having two angularly disposed troughs 18 leading into the channel. In child delivery operations the plate is placed at the lower end of the table, as illustrated in Figures 1 and 2, and the blood lost by the patient will be deposited on the plate and will flow into the troughs and down the channel 17.

Conveniently positioned preferably adjacent the same end of the table as the plate 15 is the relatively large cylindrical vertically disposed receptacle 19 which is provided adjacent its lower end with a horizontally disposed tube 20 which may be either integral with the receptacle or suitably secured thereto and which is provided with openings as at 21 which communicate with the interior of the receptacle. The tube 20 is closed at one of its ends as at 22 and is open and extends through the receptacle at its opposite end 23 which is suitably connected as by means of the stub pipe 24, coupling 25 and elbow 26 to the relatively small vertically disposed cylinder or pipe 27. Between the member 20 and the tube 24 a strainer 28 is preferably disposed to prevent the passage of impurities or solid matter into the cylinder 27, and a removable strainer 29 connected to a suitable handle member 30 is preferably disposed in the receptacle 19 immediately above the member 20. The strainer 19 will likewise prevent the passage of solid matter into the cylinder 27 and also where the apparatus is used in the measuring of blood the strainer 29 can be used in removing the blood from the receptacle after it has congealed.

The receptacle 19 is preferably provided with a removable and adjustable mounting for securing it to the table and to this end a cross arm formed in three sections 31, 32 and 33 is secured to two of the legs of the table as by means of suitable clamps 34 operated and controlled by the wing nuts 35. The sections 31 and 33 have adjustable connection with the middle section 32 by means of the screw-threaded members 36 secured to the members 31 and 33 and extending through the slots 37 in the member 32. Wing nuts 38 are threaded to the ends of the members 36. Secured to the central section 32 is a bracket indicated generally by the numeral 39 formed with the two horizontally projecting arms 40 provided with slots 41 having engagement with slots 42 formed in the members 43 which are suitably secured to the receptacle 19 and the small cylinder 27.

The bracket 39 is also provided with a depending member 44 having a semi-circular arm 45 at its lower end positioned so as to engage and support the receptacle 19. The upper end of the receptacle 19 is preferably formed with a lip portion 46 to which is adjustably secured as by means of the wing nuts 47 a slide or chute 48. The slide is preferably extendable and retractable so that it may be moved out of the way when not in use, and moved into operating position with its end beneath the channel 17 when in use, and for this purpose it is formed in two sections, a slidable section 49 and a stationary section 50 having a pin and slot connection indicated by the numerals 51 and 52. A mechanism whereby the extending or retracting of the chute may be controlled by the foot of the operator is provided, such as the foot operated air pump 53 connected by the tube 54 to a cylinder 55 mounted on the section 50 of the chute.

In the cylinder 55 is a piston 56 connected by means of arm 57 to the bracket 58 secured to the slidable portion 49 of the chute 48. The bracket 58 is preferably formed with a plurality of holes 59 so that the connection between the piston and the member 49 may be adjusted. A spring 60 disposed in the cylinder above the piston 56 normally urges the piston downwardly so as to retract the chute 48. The pump 53 is the conventional piston type pneumatic pump provided with a one way valve and operated by pressing on the member 61 with the foot, thereby forcing air through the tube 54 into the cylinder 55, urging the piston 56 upwardly and extending the chute 48 until its upper end is in position beneath the channel 17 formed in the plate 15. The chute may be retracted by reducing the pressure in the cylinder as by removing the tube 54 from the cylinder or pump or by means of a foot valve (not shown).

The small cylindrical member 27 which is connected to the receptacle 19 preferably communicates adjacent its upper end by means of a tube 62 to the reservoir 63, containing mercury or a colored liquid, forming part of a pressure gage 64. The gage may be a conventional type having a glass tube 65 connected adjacent the lower end of the reservoir 63 and provided with suitable markings are graduations 66 adjacent the glass tube 65 to indicate the quantity of liquid being measured. A transparent protecting guard 67 preferably made of glass may be disposed around the tube 65. The tube 65 communicates at its upper end 68 with the atmosphere so that the pressure in the small cylinder 27 will be accurately recorded by the height of the colored fluid or mercury in the tube. The gage is conveniently positioned preferably in approximately the same plane as the top of the table so as to face towards the end of the table where the operator is working, and may be secured in place by means of a bracket 69 fastened to the arm 70 secured to one of the legs of the table.

In operation it is preferred to place a suitable liquid seal such as water in the lower end of the receptacle 19 and cylinder 27 as shown at 71. The graduations 66 should be so arranged that when the liquid seal has been provided the gage will show a reading of empty. When the patient is in position on the table the chute 48 is extended by means of the pump 53. The plate 15 is so positioned that any blood lost in the operation will deposit upon the plate and will pass through channel 17, down chute 48, into the receptacle 19. As the blood accumulates in the receptacle 19, due to the well known hydro-dynamic paradox the fluid forming the seal 71 will tend to rise in the cylinder 27 to a height proportional to the height of the liquid in receptacle 19. This will increase the pressure in the cylinder 27 and tube 62 and thereby causing the mercury or colored fluid in the reservoir 63 of gage 64 to rise in the tube 65. The graduations on the gage are such as to accurately show the quantity of blood or other fluid which has accumulated in the receptacle 19. It will be seen that the operator can at all times throughout the operation tell the exact amount of blood lost by the patient and due to the convenient position of the gage need not withdraw his attention from the field of operation.

It is to be understood, of course, that modifications may be made in the illustrated and described embodiment of my invention, and that my improved measuring apparatus may be used in association with devices other than delivery tables.

I claim:

1. A fluid accumulating and measuring device for use with an operating table comprising a vertically disposed receptacle having a relatively large cross section, a cylinder having a relatively small cross section forming a pressure chamber and having connection adjacent its lower end with the lower end of said receptacle, means for conducting liquid deposited on the operating table to said receptacle, a removable strainer positioned in said receptacle a short distance above the point of connection with the cylinder and having a handle extending upwardly above said receptacle, and a pressure gage connected to said cylinder and cooperable to indicate the amount of fluid in said receptacle, said gage being provided with means for securing it to the operating table at a clearly visible position.

2. A fluid accumulating and measuring device for use with an operating table comprising a receptacle for holding and measuring a fluid, a member providing a pressure chamber having connection with the lower end of the receptacle, means for conducting liquid deposited on the operating table to said receptacle, a removable strainer positioned in said receptacle a short distance above the point of connection with the chamber in said member and having a handle extending upwardly above said receptacle, and a pressure gage connected to said pressure chamber and cooperable to indicate the amount of fluid in said receptacle, said gage being provided with means for securing it to the operating table at a clearly visible position.

JOHN B. PASTORE.